Patented Aug. 14, 1945

2,382,462

UNITED STATES PATENT OFFICE 2,382,462

OIL-RESISTANT THERMOPLASTIC AND METHOD OF MAKING

David J. Beaver, St. Albans, W. Va., assignor to Monsanto Chemical Company, St. Louis, Mo., a corporation of Delaware No Drawing. Application November 1, 1941, Serial No. 417,577

17 Claims. (Cl. 260—714)

This invention relates to new plastic products derived from scrap or reclaimed rubbers and to the preparation of the same.

In accordance with this invention scrap or reclaimed rubber is treated with tolyl dichlor phosphine and retene in such proportion as to produce a vulcanizable plastic material which is resistant to the deteriorating effects of ozone, oxygen, oil, grease, gasoline and other materials which exert a solvent action on rubber, and which at the same time possess a maximum of rubbery properties.

While the properties of the final products will in part be determined by the particular reclaimed or scrap rubber used as the starting material, the similarities are more striking than the differences. In every case it has been found that the solvent and ozone resistance of the original rubber material are very greatly enhanced by reacting with technical tolyl dichlor phosphine and technical retene or retene oil in the proportions hereinafter set forth. Examples of scrap and reclaimed rubbers which have been successfully reacted include Midwest whole tire reclaim, Xylos ground scrap, Apex tube reclaim, Midwest ground black inner tube and ground truck peels. The above list is merely illustrative and it is to be understood that other scrap and reclaimed rubbers whether obtained by an acid or alkali reclaiming process can be reacted in similar manner.

The tolyl dichlor phosphine used in the present invention is the product resulting from the reaction of toluene and $PCl_3$ in the presence of anhydrous aluminum chloride and contains most if not all of the catalyst used in the preparation. While there are several varieties of products answering this description, they are all more or less alike and the generic class will be referred to as "technical" tolyl dichlor phosphine in the discussion following as well as in the attached claims. When the preparation of tolyl dichlor phosphine is carried out according to the directions given in the literature (Liebig's Annalen vol. 212, p. 206–7) the product after the reaction, separates into two layers. The upper layer consists essentially of unreacted hydrocarbon and phosphorus trihalide together with a small amount of tolyl dichlor phosphine. The bottom layer contains most of the tolyl dichlor phosphine together with small amounts of unreacted materials and most of the catalyst, the latter most probably being in the form of a complex addition product. The crude mixture remaining after drawing off the upper layer, i. e. the bottom layer, can be reacted directly with the rubber reclaim or scrap and is in fact preferred to pure tolyl dichlor phosphine.

While the above picture applies when the proportion of catalyst reported in the literature is used, it has been found that the reaction can be driven further toward completion by increasing the proportion of catalyst so that eventually no layers separate. However, the product produced, at least for the purposes of this invention, is equivalent to that described above and in fact appears to be identical in every respect. In addition the crude reaction product, whether a bottom layer or an entire reaction mixture obtained with a higher proportion of catalyst, may be heated up to distill out unreacted phosphorus trichloride and toluene or alternatively sufficient catalyst used to consume substantially all of the reactants. Obviously the resulting product is not a weight for weight equivalent of the product just mentioned since it contains a higher proportion of active constituent. It will, therefore, be hereinafter referred to as "stripped" tolyl dichlor phosphine and the unstripped varieties will be called "crude" tolyl dichlor phosphine. Accordingly technical tolyl dichlor phosphine may be either the "crude" or "stripped" variety.

The following example illustrates in detail the preparation of technical tolyl dichlor phosphine:

Into a suitable glass or glass lined reaction vessel fitted with a reflux condenser there was charged 600 parts by weight of toluene, 800 parts by weight of $PCl_3$ and 120 parts by weight of anhydrous aluminum chloride. The mixture was then heated to refluxing temperature at which temperature it was maintained for about 36 hours. When cool the reaction mixture separated into two portions. The bottom layer amounting to substantially 840 parts by weight was drawn off and either immediately reacted with rubber or stored in moisture proof containers. These precautions are advisable because tolyl dichlor phosphine and analogous materials hydrolize to the corresponding acids. However, the presence of small amounts of water during the subsequent reaction with the rubber has no noticeable effect.

When the aluminum chloride was increased to 140 parts by weight in the foregoing procedure, no layers separated. The entire reaction charge of crude tolyl dichlor phosphine is a weight for weight equivalent of the crude tolyl dichlor phosphine separated as a lower layer.

When heated up to distill off unreacted $PCl_3$ and toluene the 840 parts by weight of "crude" gave approximately 500 parts by weight of "stripped" tolyl dichlor phosphine. Obviously, the total quantity of unreacted material separated from a given reaction will be known and it is a simple matter to calculate the quantity of "stripped" product equivalent to a given weight of the "crude."

There is no advantage in using chemically pure retene since a technical grade formed in the distillation of pine tar oil resulting from the destructive distillation of pine wood or rosin can be used. The usual process comprises vacuum distilling the ordinary pine tar oil of commerce to obtain the light, medium and heavy pine tar fractions. Then, by a further distillation of the residue under pressure, the wood phenols and neutral retene oil are obtained. This neutral retene oil contains up to about 35% retene, the remainder being for the most part, hydroretene. Either the neutral retene oil or a technical grade of retene obtained therefrom can be used in the practice of the present invention and are substantially equivalent. "Technical retene" and "neutral retene oil" are terms having a well defined meaning and are so used in the present specification. In general any crude commercial retene containing as the impurity other hydrocarbon products from the distillation of wood can be used.

As indicated above, the scrap or reclaimed rubber, tolyl dichlor phosphine and crude retene must be combined within a certain critical range of proportions in order to achieve the combination of properties desired. In particular, it has been found that any reclaimed or scrap rubber is enormously improved with regard to resistance to solvents and ozone providing that the rubber is treated with technical dichlor phosphine equivalent to at least 60 parts by weight of the "crude" and at least 40 parts by weight of technical retene or retene oil per 100 parts by weight of the rubber. For best results the proportion of each reactant should be from 70 to 85 parts by weight, the optimum being about 80. Since excessive amounts of either the phosphine halide or retene decrease the rubbery properties the upper limit is equally important. The technical tolyl dichlor phosphine should always be used in a proportion equivalent to less than 100 parts by weight of "crude" and the technical retene should likewise be less than 100 parts by weight per 100 parts by weight of rubber. Furthermore, while it is to be emphasized that any variations within the limits specified are permitted, it is preferred to treat the rubber with equal weights of crude tolyl dichlor phosphine and retene or at least to use as much retene as crude tolyl dichlor phosphine and preferably from 70 to 85 parts of each ingredient. The products then are not only solvent and ozone resistant but possess a maximum of rubbery properties. After compounding and curing in a stock carrying 40 parts of carbon black the hardness is below 90 as measured by a Shore durometer type "A" and there is negligible if any cracking after three minutes exposure of the stock to ozone of such concentration that a similar stock compounded from smoked sheets of rubber is badly cracked after an exposure of one minute.

In order to produce the new plastic products it is essential that the reactants be brought into intimate and uniform association. To this end, use of a solvent as for example benzene, toluene or carbon disulfide is of considerable benefit. However, an efficient internal type mixer of corrosion resistant material such as stainless steel will give the proper association of reactants in which case the solvent can be eliminated.

The temperature range preferred for carrying out the reaction ranges from the boiling point of a carbon bisulfide cement to about 60° C. While either higher or lower temperatures can be used, there is no advantage since below room temperature the reaction is unduly prolonged and at higher temperatures the reaction and in turn, the properties of the final products, are more difficult to control although the reaction will of course be complete in a shorter time. However, from about room temperature up to about 60° C. the time of reaction is not especially critical. Comparable results are obtained by initially associating the rubber and tolyl dichlor phosphine in toluene, carbon bisulfide or similar solvent for from one to three hours, adding the retene and continuing the reaction for from 6 to 24 hours.

The following specific examples will illustrate the preparation in detail and are to be understood as descriptive and explanatory but not limitative of the invention.

*Example I*

Substantially 100 parts by weight of ground truck peels were dispersed in a suitable solvent as for example toluene and substantially 80 parts by weight of crude tolyl dichlor phosphine added thereto. The charge was stirred and heated at about 55° C. for about two hours and substantially 80 parts by weight of technical retene added. Heating and stirring at 55° C. was continued for about 18 hours after which the solvent was removed, preferably by distillation. Heating was continued for a short time after distillation had substantially ceased and then live steam was introduced. After a thorough steaming out the charge was removed and washed with water on a rubber mill, preferably one having corrugated rolls, or on other equipment especially adapted for washing tough plastic products. The product was dried by milling on a hot mill followed by heating to constant weight in a vacuum oven. Substantially 202 parts by weight of tough rubbery product resistant to ozone and solvents was obtained.

*Example II*

Into an internal type mixer of suitable capacity there was charged substantially 200 parts by weight of ground truck peels and substantially 160 parts by weight of technical retene. The charge was rendered homogenous by blending for about two hours and then substantially 160 parts of crude tolyl dichlor phosphine added and the mixer run for another two hour period. Heat was then applied sufficient to raise the temperature to 60° C. and the charge heated for about 3½ hours. Water or dilute alkali was then added and the product washed until neutral. The final washing is most conveniently carried out on a rubber washing mill. After drying to constant weight 414 parts by weight of tough rubber like plastic was obtained.

*Example III*

Substantially 200 parts by weight of ground truck peels were charged into an internal type mixer of suitable capacity and masticated at about 100° C. to drive out any entrained water. While not essential, this step is desirable in order to effect a closer control over the properties of the final product and can be advantageously applied to a mixture of the rubber and retene ingredient as well as to either or both of them separately. Substantially 160 parts by weight of neutral retene oil was then added and after blending about an hour to assure homogeneity, substantially 160 parts by weight of crude tolyl dichlor phosphine added and the blending continued for another hour. In this connection, it is possible that an appreciable reaction has taken place at this stage. The temperature was raised to 60° for about 4½ hours and the reaction terminated by the addition of water. The product was washed with water or better with dilute alkali and finally with water, until neutral and dried to constant weight. Substantially 412 parts by weight of tough rubber like plastic was obtained.

As illustrative of the useful properties of the new products stocks were compounded comprising plastic 100, zinc oxide 10, carbon black 40, sulfur 5, mercaptobenzothiazole 1.5, stearic acid 3, pine tar 2 and acetone-p-amino diphenyl condensation product 1.5 (all parts are by weight). The stocks were cured by heating in a press in the usual manner and examinations made into the physical properties of the cured rubber products. The table set forth below summarizes the results and shows the proportion of reactants used in making the products in relation to the results obtained. All proportions are based on 100 parts by weight of the scrap or reclaimed rubber. The 50 parts of stripped tolyl dichlor phosphine used to make the product from which stock No. 5a was compounded was obtained from 80 parts of the "crude." 80 parts of "stripped" (stocks 8–10) corresponds to about 128 parts of "crude." The plastic rubber derivative used in stocks Nos. 1, 3a, 6 and 7 was made from Midwest whole tire reclaim following Example I above; that used in stock 3b was made from Xylos ground scrap following Example I; that in stock 3c was made from Midwest ground black inner tubes following Example I and that used in stocks Nos. 2, 3, 4, 5, 5a, 8 and 10 was made from ground truck peels following Example I. The product of Example II was used in stock 5b and the product of Example III was used in stock 5c. The concentration of ozone to which the cured stocks were exposed was such that a similar stock compounded from smoked sheets of rubber was badly cracked after one minute exposure under slight stress. The stress was applied by losely fastening together the two ends of a rectangular strip of the cured stock. Hardness was measured on a Shore durometer type "A." The immersion tests are self-explanatory.

| Stock No. | Tech. tolyl dichlor phosphine, parts by weight | Tech. retene, parts by weight | Hardness after cure Shore | Cracking after 3 min. exposure to ozone under stress | Percent change in wt. after 72 hrs. immersion at room temp. in— | |
|---|---|---|---|---|---|---|
| | | | | | Gasoline | Lub. oil |
| 1 | 50 crude | 50 | | Cracked badly | +2.2 | −2.1 |
| 2 | 60 crude | 60 | 82 | Very slight | +3.4 | −0.9 |
| 3 | 70 crude | 70 | 82 | None | 0.4 | −2.0 |
| 3a | do | 70 | 77 | do | −2.5 | −2.6 |
| 3b | do | 70 | 78 | do | +0.2 | −2.5 |
| 3c | do | 70 | 76 | do | +3.2 | −3.6 |
| 4 | 80 crude | 70 | 88 | do | +2.3 | −1.0 |
| 5 | do | 80 | 85 | do | −2.7 | −2.5 |
| 5a | 80 stripped | 80 | 71 | do | +2.5 | −3.6 |
| 5b | 80 crude | 80 | 78 | do | +4.4 | −4.1 |
| 5c | do | ¹80 | 80 | do | +7.8 | −5.1 |
| 6 | 100 crude | 50 | ²96 | (Brittle) | | |
| 7 | do | 100 | 76 | (Low tensile strength; lazy cures) | | |
| 8 | 80 stripped | 20 | ²95 | Visible cracking | +16.2 | +5.6 |
| 9 | do | 40 | ²93 | None | +8.5 | +4.2 |
| 10 | do | 60 | ²91 | do | +5.8 | −3.5 |

¹ R. oil.
² Compounded with 20 instead of 40 parts of carbon black.

The above data show that at least 40 parts by weight of technical retene or retene oil are necessary to impart resistance to ozone, gasoline, lubricating oil and the like and that this is so in spite of the fact that the proportion of tolyl dichlor phosphine may be excessive (stocks 8, 9 and 10). It is further evident that a proportion of tolyl dichlor phosphine equivalent to 60 parts by weight of the "crude" is necessary for good resistance to ozone (stocks 1 and 2). On the other hand, as much as 100 parts of the phosphine halide renders the product hard and brittle (stock 6). While this can be overcome by increasing the retene ingredient to 100 parts, this sacrifices the physical properties, particularly the tensile strength of the resulting products.

This invention is not limited to the specific examples and compositions set forth to illustrate the invention. Other solvents as for example carbon disulfide, benzene, xylene and the like may be used or where following Example II or III a small proportion of a solvent may be added to aid the blending. Other fillers, compounding, and vulcanizing ingredients than those particularly mentioned may be utilized. Furthermore, the new plastic products of this invention can be admixed with other gums or resins whether of natural or synthetic origin. This invention is limited solely by the claims attached hereto as part of the present specification.

What is claimed is:

1. The method of making a new plastic product which comprises intimately mixing a member of a group consisting of scrap rubber and reclaimed rubber with technical tolyl dichlor phosphine having one tolyl radicle and two chlorine atoms directly attached to a trivalent phosphorus atom and consisting of the reaction product containing the catalyst complex of toluene and PCl₃ in the presence of aluminum chloride catalyst and retene in the proportion of substantially 100 parts by weight of the rubber, technical tolyl dichlor phosphine equivalent to at least 60 but less than 100 parts by weight of crude tolyl dichlor phosphine and at least 40 but less than 100 parts by weight of said retene ingredient and heating the mixture.

2. The method of making a new plastic product which comprises intimately mixing a member of a group consisting of scrap rubber and reclaimed rubber with technical tolyl dichlor phosphine having one tolyl radicle and two chlorine atoms directly attached to a trivalent phosphorus atom and consisting of the reaction product containing the catalyst complex of toluene and PCl₃ in the presence of aluminum chloride catalyst and a crude cheap grade of retene in the proportion of substantially 100 parts by weight of the rubber, technical tolyl dichlor phosphine equivalent to at least 60 but less than 100 parts by weight of crude tolyl dichlor phosphine and at least 60 but less than 100 parts by weight of said retene ingredient and heating the mixture.

3. The method of making a new plastic product which comprises intimately mixing a member of a group consisting of scrap rubber and reclaimed rubber with technical tolyl dichlor phosphine having one tolyl radicle and two chlorine atoms directly attached to a trivalent phosphorus atom and consisting of the reaction product containing the catalyst complex of toluene and PCl₃ in the presence of aluminum chloride catalyst and technical retene in the proportion of substantially 100 parts by weight of the rubber, technical tolyl dichlor phosphine equivalent to from 70 to 85 parts by weight of crude tolyl dichlor phosphine and from 70 to 85 parts by weight of said retene ingredient and heating the mixture.

4. The method of making a new plastic product which comprises intimately mixing a member of a group consisting of scrap rubber and reclaimed rubber with technical toylyl dichlor phosphine having one tolyl radicle and two chlorine atoms directly attached to a trivalent phosphorus atom and consisting of the reaction product containing the catalyst complex of toluene and PCl₃ in the presence of aluminum chloride catalyst and neutral retene oil in the proportion of substantially 100 parts by weight of the rubber, technical tolyl dichlor phosphine equivalent to 80 parts by weight of crude tolyl dichlor phosphine and 80 parts by weight of said retene ingredient and heating the mixture.

5. The method of making a new plastic product which comprises intimately mixing a member of a group consisting of scrap rubber and reclaimed rubber with technical tolyl dichlor phosphine having one tolyl radicle and two chlorine atoms directly attached to a trivalent phosphorus atom and consisting of the reaction product containing the catalyst complex of toluene and PCl₃ in the presence of aluminum chloride catalyst and neutral retene oil in the proportion of substantially 100 parts by weight of the rubber, technical tolyl dichlor phosphine equivalent to from 70 to 85 parts by weight of crude tolyl dichlor phosphine and from 70 to 85 parts by weight of neutral retene oil and heating the mixture.

6. The method of making a new plastic product which comprises intimately mixing a member of a group consisting of scrap rubber and reclaimed rubber in an organic solvent below 60° C. with technical dichlor phosphine having one tolyl radicle and two chlorine atoms directly attached to a trivalent phosphorus atom and consisting of the reaction product containing the catalyst complex of toluene and PCl₃ in the presence of aluminum chloride catalyst equivalent to at least 60 but less than 100 parts by weight of crude tolyl dichlor phosphine per 100 parts by weight of the rubber and further reacting the product under the same conditions with at least 60 but less than 100 parts by weight of a crude cheap grade of retene.

7. The method of making a new plastic product which comprises intimately mixing 100 parts by weight of a member of a group consisting of scrap rubber and reclaimed rubber with from 70 to 85 parts by weight of crude tolyl dichlor phosphine comprising the structure

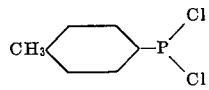

in an organic solvent for from 1 to 3 hours above room temperature but below 60° C. to effect a partial reaction and further treating the product with from 70 to 85 parts by weight of technical retene by heating for from 6 to 24 hours under similar conditions.

8. The method of making a new plastic product which comprises masticating substantially 100 parts by weight of a member of a group consisting of scrap rubber and reclaimed rubber with from 70 to 85 parts by weight of technical retene, adding tolyl dichlor phosphine comprising the structure

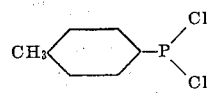

equivalent to from 70–85 parts of crude tolyl dichlor phosphine and effecting a reaction by mild heating.

9. The method of making a new plastic product which comprises intimately mixing 100 parts by weight of ground truck peels rubber with 80 parts by weight of crude tolyl dichlor phosphine comprising the structure

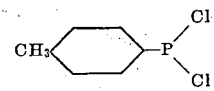

in toluene at 55° C. for 1 to 3 hours to effect a partial reaction and further treating with 80 parts by weight of technical retene for about 18 hours at 55° C.

10. An elastic rubber like sulfur vulcanizable derivative of a member of a group consisting of scrap rubber and reclaimed rubber which has high resistance to cracking in ozone, very low absorptive capacity in lubricating oil and gasoline obtained by intimately mixing 100 parts by weight of the rubber with technical tolyl dichlor phosphine having one tolyl radicle and two chlorine atoms directly attached to a trivalent phosphorus atom and consisting of the reaction product containing the catalyst complex of toluene and PCl₃ in the presence of aluminum chloride catalyst equivalent to at least 60 but less than 100 parts by weight of crude tolyl dichlor phosphine and at least 40 but less than 100 parts by weight of retene and heating the mixture.

11. An elastic rubber like sulfur vulcanizable derivative of a member of a group consisting of scrap rubber and reclaimed rubber which has high resistance to cracking in ozone, very low absorptive capacity in lubricating oil and gasoline obtained by intimately mixing 100 parts by weight of the rubber with technical tolyl dichlor rine atoms directly attached to a trivalent phosphorus atom and consisting of the reaction product containing the catalyst complex of toluene and PCl₃ in the presence of aluminum chloride catalyst equivalent to from 70 to 85 parts by weight of crude tolyl dichlor phosphine and from 70 to 85 parts by weight of neutral retene oil and heating the mixture.

12. An elastic rubber like sulfur vulcanizable derivative of a member of a group consisting of scrap rubber and reclaimed rubber which has high resistance to cracking in ozone, very low absorptive capacity in lubricating oil and gasoline obtained by intimately mixing 100 parts by weight of the rubber with technical tolyl dichlor phosphine having one tolyl radicle and two chlorine atoms directly attached to a trivalent phosphorus atom and consisting of the reaction product containing the catalyst complex of toluene and $PCl_3$ in the presence of aluminum chloride catalyst equivalent to from 70 to 85 parts by weight of crude tolyl dichlor phosphine and from 70 to 85 parts by weight of technical retene and heating the mixture.

13. An elastic rubber like sulfur vulcanizable derivative of vulcanized ground scrap rubber which has high resistance to cracking in ozone, very low absorptive capacity in lubricating oil and gasoline obtained by intimately mixing 100 parts by weight of the rubber with technical tolyl dichlor phosphine having one tolyl radicle and two chlorine atoms directly attached to a trivalent phosphorus atom and consisting of the reaction product containing the catalyst complex of toluene and $PCl_3$ in the presence of aluminum chloride catalyst equivalent to from 70 to 85 parts by weight of crude tolyl dichlor phosphine and from 70 to 85 parts by weight of neutral retene oil and heating the mixture.

14. An elastic rubber like sulfur vulcanizable derivative of vulcanized ground scrap rubber which has high resistance to cracking in ozone, very low absorptive capacity in lubricating oil and gasoline obtained by intimately mixing 100 parts by weight of the rubber with technical tolyl dichlor phosphine having one tolyl radicle and two chlorine atoms directly attached to a trivalent phosphorus atom and consisting of the reaction product containing the catalyst complex of toluene and $PCl_3$ in the presence of aluminum chloride catalyst equivalent to from 70 to 85 parts by weight of crude tolyl dichlor phosphine and from 70 to 85 parts by weight of technical retene and heating the mixture.

15. An elastic rubber like sulfur vulcanizable derivative of a member of a group consisting of scrap rubber and reclaimed rubber which has high resistance to cracking in ozone, very low absorptive capacity in lubricating oil and gasoline obtained by intimately mixing 100 parts by weight of the rubber with approximately 80 parts by weight of crude tolyl dichlor phosphine comprising the structure

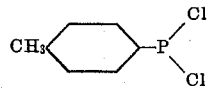

and approximately 80 parts by weight of a crude cheap grade of retene and heating the mixture.

16. An elastic rubber like sulfur vulcanizable derivative of vulcanized scrap rubber which has high resistance to cracking in ozone, very low absorptive capacity in lubricating oil and gasoline and in which the vulcanized scrap rubber makes up only about half the total product obtained by intimately mixing 100 parts by weight of vulcanized scrap rubber with approximately 80 parts by weight of crude tolyl phosphine dichloride comprising the structure

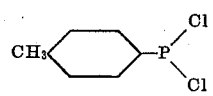

and approximately 80 parts by weight of technical retene and heating the mixture below 60° C.

17. An elastic rubber like sulfur vulcanizable derivative of ground truck peels rubber which has high resistance to cracking in ozone, very low absorptive capacity in lubricating oil and gasoline and in which the ground truck peels make up only about half the total product obtained by intimately mixing 100 parts by weight of ground truck peels with approximately 80 parts by weight of crude tolyl phosphine dichloride comprising the structure

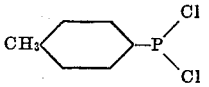

and approximately 80 parts by weight of technical retene and heating the mixture below 60° C.

DAVID J. BEAVER.